United States Patent Office.

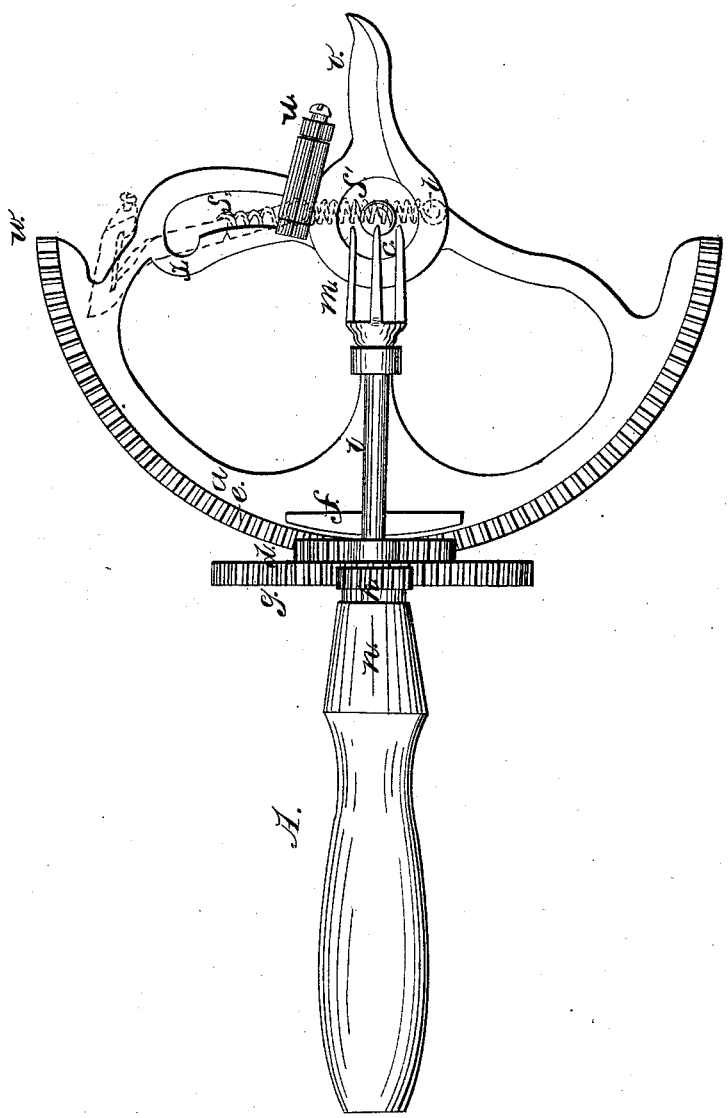

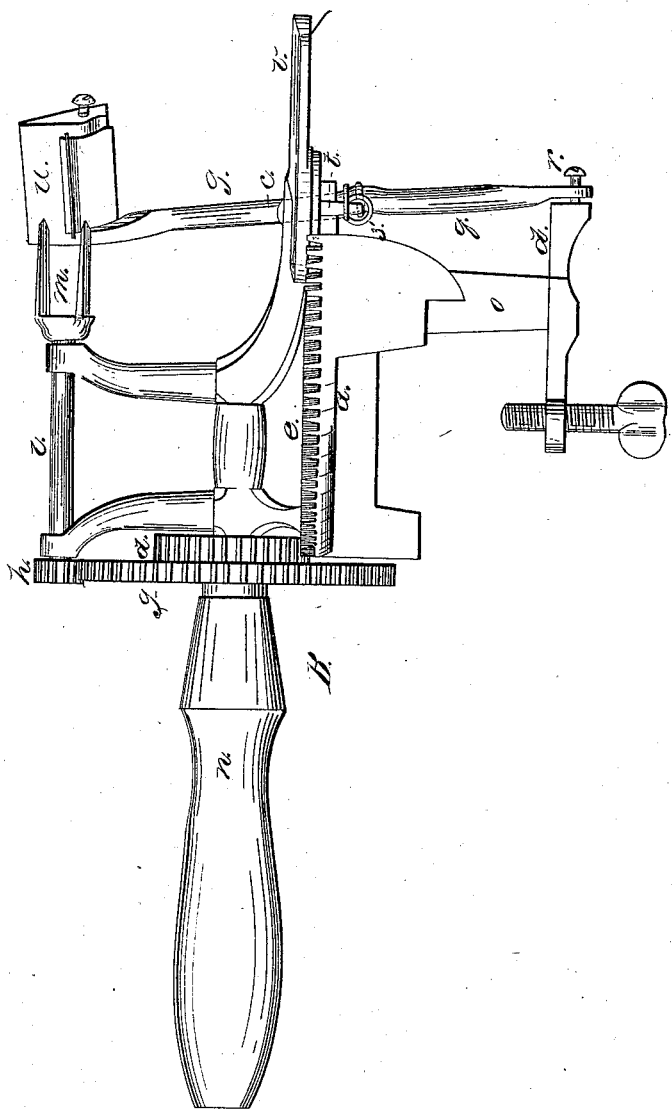

D. H. GOODELL, OF ANTRIM, NEW HAMPSHIRE.

Letters Patent No. 65,804, dated June 18, 1867.

IMPROVED FRUIT-PARER.

The Schedule referred to in these Letters Patent and making part of the same.

TO ALL WHOM IT MAY CONCERN:

Be it known that I, D. H. GOODELL, of Antrim, in the county of Hillsborough, and State of New Hampshire, have invented an Improved Fruit-Parer; and I do hereby declare that the following, taken in connection with the drawings which accompany and form part of this specification, is a description of my invention sufficient to enable those skilled in the art to practise it.

The invention relates not so much to the specific construction of any of the parts forming the paring mechanism, as to the general arrangement of all these parts, and to the combination with a crank or bent arm of a knife, against the cutting-edge of which the surface to be pared is pushed instead of drawn, the crank or bend in the arm, by the action of a spring, turning the knife over the rounding surface of the fruit as the fork and apple rotate.

A mechanism embodying my invention is represented in the drawings, A showing a plan, and B a side elevation of the same. A denotes a semicircular gear and base-plate, provided with a clamp, by which it is secured horizontally to the surface of a table. Supported on this plate is a reciprocating frame, $b$, turning horizontally on a pin or centre, $c$, and having journalled at its outer end a gear, $d$, meshing into the horizontal gear-teeth $e$ on the perimeter of the plate $a$. The frame $b$ has a foot, $f$, extending out upon its opposite sides, and just within the teeth $e$, the contact or proximity of which with the surface of the plate tends to keep the frame in upright position, and facilitates its easy reciprocation around the plate. Integral with or fixed to the gear $d$ is another gear, $g$, whose teeth mesh into and drive a pinion, $h$, on the end of the fork-shaft $i$, turning in bearings in the top of the frame $b$, this shaft having at its inner end the fruit-holder or fork $m$. Extending outward from the frame $a$, in line with the journal-pin or shaft on which the gear $d$ turns, is a horizontal handle, $n$, by driving or pushing which horizontally in either direction, the frame $b$ swings on the centre pin $c$, causing the gear $d$ to be rotated by gear-teeth $e$, the rotation of this gear by the mediation of gears $g$ $h$ effecting the rotation of the fork. Extending down from the plate $a$ is a vertical post, $o$, to an arm, $p$, of which the knife-rod $q$ is jointed by a pin, $r$, this connection being such as to permit the rod to turn somewhat loosely. This rod extends up through a cam-slot, $s$, in the plate $a$, and has a slight bend in it, at which bend a spring, $s'$, connects the rod to a projection, $t$, near the centre of the plate $a$. This spring draws the knife-head $u$ up toward the fork or against the surface of the fruit being pared, and the bend in the rod is such that the connection of the spring thereto causes the knife-edge to roll over the surface of the apple during the rotation of the apple and the operation of paring.

When an apple is to be pared, the handle $n$ is brought round to the end $w$ of the plate, and the fruit is crowded upon the fork at the stem or the blossom end thereof. Then by pushing the handle $n$ the fruit is rotated against the cutting-edge of the knife, and from the impaled to the opposite end of the fruit, causing the skin to be evenly and perfectly removed thereform, as will be readily understood. As the handle reaches the opposite end of the gear-plate, an arm, $v$, extending from frame $b$ strikes the rod $q$, and crowds it outward until it slips into an extension or notch, $x$, of the cam-slot $s$, where it is held by the retraction of spring $s'$, the fruit being thereby carried away from further action of the knife. The pared fruit may now be withdrawn and replaced by a fresh one, and the handle drawn back, the frame striking the rod $q$ when drawn over the cam-slot, and thereby causing the rod to slip from the notch $x$, and the cutter to be drawn down into contact with the newly impaled fruit.

Now, so far as the employment of the knife-rod, having a bend or crank in it, with a loose connection of the rod to an extension from the base or gear-plate, and a spring acting upon this bend in the rod to keep the edge of the knife in cutting position as the apple is rotated, is concerned, and, so far also as the employment of the cam-slot for carrying the cutter away from the fruit after the paring operation, and holding it until the apple is removed from the fork and another apple placed thereon, is concerned, the construction herein described is not broadly new, as such devices will be found in patents granted for improvements made by E. L. Pratt, in Patents 40,185 and 43,956, which patents are owned by myself and George R. Carter, (assignees of my present invention.) But the arrangement of mechanism in such parers is not such as to render the operation of paring an easy one, and my object has been to make a better disposition and connection of these devices together, to enable the parer to be more expeditiously and readily operated, and I effect this by placing the cam-slot in the horizontal gear-plate, with the knife-rod running vertically through it, with the bend in the rod just below the slot, and extending the handle horizontally from the fork-frame just above the gear-plate, so that by reciprocation of the handle horizontally over the table to which the parer is clamped, each apple is pared, the knife caused to turn over the surface of the apple during the rotation of the apple, the cutter carried away from the apple as the paring is finished, and carried down against the surface of a newly placed apple as the handle is moved back to its starting point. In the other parers referred to, the apple surface is drawn up against the cutting-edge, but in this arrangement the cutting-edge is placed at the outer end of the head, so that as the handle is pushed from the operator, the fork is rotated in the direction of the arrow, driving the apple surface down against the cutting-edge, instead of paring by drawing the handle toward the operator, and drawing the apple surface up against the paring-edge of the knife.

I claim the combination of the arm $v$ with the notched slot $s$ in the plate, for the purpose described.

I also claim the described fruit-parer, when all its parts are arranged and operated as set forth.

D. H. GOODELL.

Witnesses:
 LUKE W. HILLS,
 CHARLES H. CARTER.